UNITED STATES PATENT OFFICE.

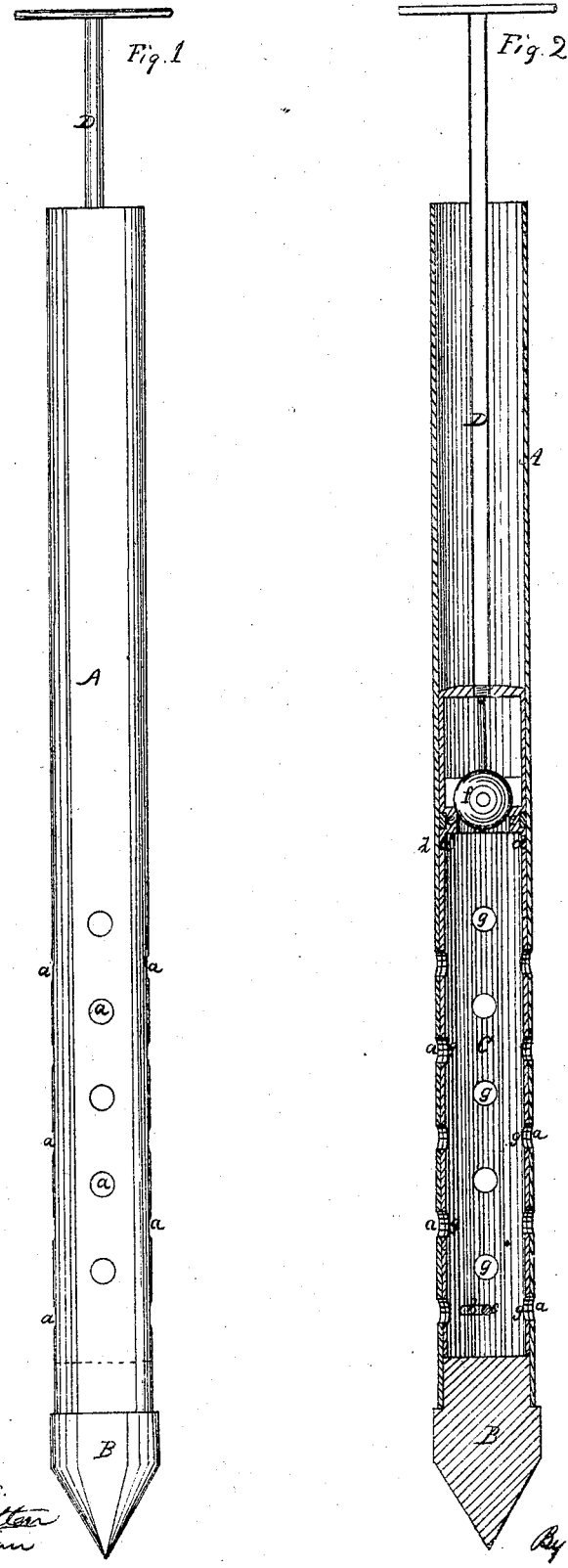

MILTON P. NOBLES, OF ROCHESTER, ASSIGNOR TO HIMSELF AND JOHN C. NOBLES, OF RUSHFORD, NEW YORK.

IMPROVEMENT IN SINKING TUBULAR WELLS.

Specification forming part of Letters Patent No. 52,931, dated February 27, 1866.

*To all whom it may concern:*

Be it known that I, MILTON V. NOBLES, of Rochester, in the county of Monroe and State of New York, have invented certain new and useful Improvements in Sinking Tubes for Wells or Pumps; and I do hereby declare the following to be a full, clear, and exact description of the same, reference being had to the accompanying drawings, making a part of this specification, in which—

Figure 1 represents an external view of the well or pump as ready for being driven down into the ground. Fig. 2 represents a section through the same as it appears in working order after the tube or pump has been sunk to the water.

My invention consists in using the valve-rod as a means of turning the inner tube to close or disclose the openings through the outer tube, so that the instant the inner cylinder is turned to admit the water to the pump the pump is complete and ready to be worked.

To enable others skilled in the art to make and use my invention, I will proceed to describe the same with reference to the drawings.

The outer tube, A, is furnished with a point, B, to enable it to penetrate the earth, and has moreover a series of holes, $a$, through it to admit the water to the pump after the water has been reached.

Inside of the outer tube, A, and near its lower end, is fitted an inner tube, C, so as to work freely therein. This inner tube should be long enough to cover the series of holes in the outer tube, and that it may turn just enough to cover or uncover the holes. It may have a slot, $b$, in it, into which a pin, $c$, is protruded, and which regulates the extent of its turning in both directions, each extreme motion either covering or uncovering said holes, as the case may be.

In the top of the inner tube, C, are two recesses, into which corresponding projections $d\ d$ on the rod D take, and by which the tube may be turned.

When the tube or pump is being forced into the ground the inner tube is turned so as to cover the holes $a$, and thus prevent the earth, sand, or gravel from being driven in through said holes and choking up the pump.

When it is supposed that water has been reached the pump-rod D, with its sucker $e$ and valve $f$, is run down, the projections $d$ turned until they catch into the recesses in the top of the tube C, and said tube is then turned to open the holes, which is done by bringing a series of holes, $g$, in itself opposite those in the external tube. This done, the pump is ready to go to work by operating the rod D in the usual well-known way of pumping.

The pump rod and valve may be left in the outer tube while it is being sunk down, and thus the entire pump, complete and ready for operation, may be driven down into the ground and trials made at any time as to whether water has been reached without withdrawing anything from or inserting anything into the outer tube, and when water has been reached the well and pump is ready to go into use at once.

The outer tube and the valve-rod may be spliced in any of the usual well-known ways as one section after another is driven into the ground.

Having described my invention, I would state that I do not claim an inner tube which is turned to close or disclose the holes in the outer tube; but What I do claim is—

Using the valve-rod D to turn the inner tube, so that as soon as or whenever the water enters the tube the pump is complete and ready to be operated without withdrawing anything from the tube or inserting anything therein, substantially as shown and described.

M. V. NOBLES.

Witnesses:
  A. B. STOUGHTON,
  EDWARD F. WOODBURY.